United States Patent [19]
Wolfson, Jr.

[11] Patent Number: 4,972,529
[45] Date of Patent: Nov. 27, 1990

[54] PROTECTIVE BLANKET FOR A SOLAR POOL COVER

[76] Inventor: Sidney K. Wolfson, Jr., 205 Buckingham Rd., Pittsburgh, Pa. 15215

[21] Appl. No.: 478,627

[22] Filed: Feb. 12, 1990

[51] Int. Cl.$^5$ .............................................. E04H 4/00
[52] U.S. Cl. ......................................... 4/500; 4/502; 4/503; 4/496
[58] Field of Search .................. 4/502, 500, 503, 661, 4/498, 504, 496; 126/415, 426

[56] References Cited

U.S. PATENT DOCUMENTS

| | | | |
|---|---|---|---|
| 2,754,900 | 7/1956 | Karbonick | 4/502 X |
| 3,019,450 | 2/1962 | Karasiewicz | 4/502 |
| 3,593,757 | 7/1971 | Haynes | 4/498 X |
| 3,707,007 | 12/1972 | Trastler | 4/500 |
| 3,864,761 | 2/1975 | Stadler | 4/502 |
| 4,094,021 | 6/1978 | Rapp | 4/503 |
| 4,103,368 | 8/1978 | Locksaw | 126/415 |
| 4,313,421 | 2/1982 | Trihey | 126/415 |
| 4,385,407 | 5/1983 | Zook | 4/499 |
| 4,470,404 | 11/1984 | Kremen | 126/415 |

*Primary Examiner*—Henry K. Artis
*Attorney, Agent, or Firm*—The Dulin Law Firm

[57] ABSTRACT

Heavy duty weather and actinic resistant protective blanket for pool covers which is attachable at the leading edge of a pool cover so that upon furling the cover, the blanket surrounds, both longitudinally and laterally, the pool cover. Fastening means to secure the blanket to itself in the furled condition is provided, preferably cooperatingly disposed strips of VELCRO ™ hook and loop material. The leading edge of the pool cover is secured to the trailing edge of the blanket by stitching, grommets, barbed plastic rivets, straps, line or the like. The blanket is at least ⅛th the length of the cover and an embodiment for free form pool cover is shown.

20 Claims, 2 Drawing Sheets

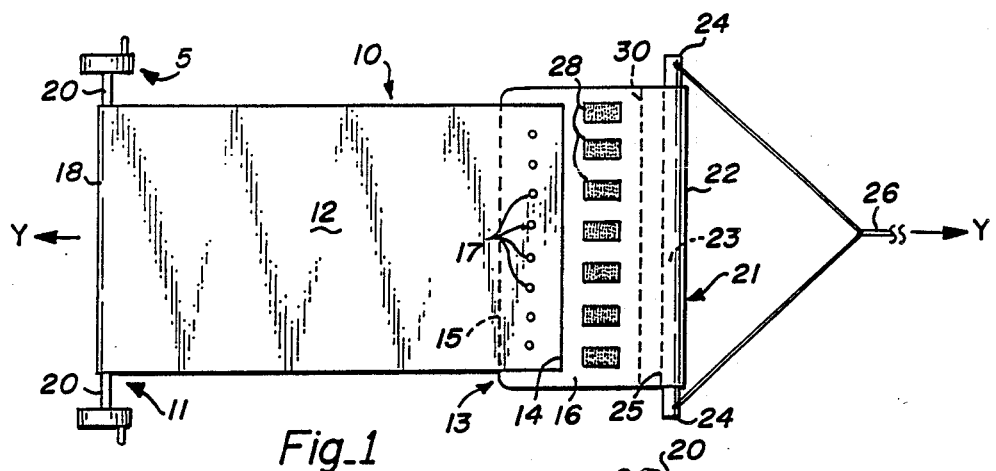
Fig_1
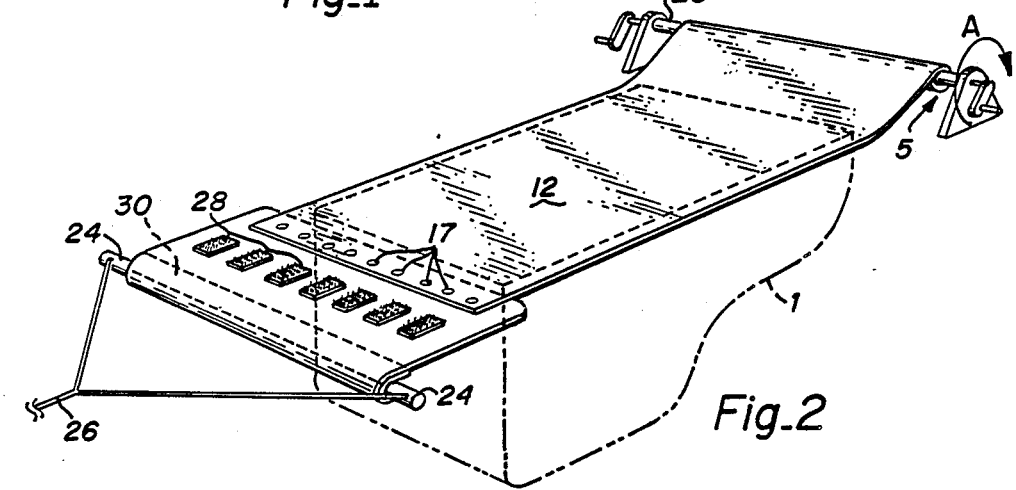
Fig_2
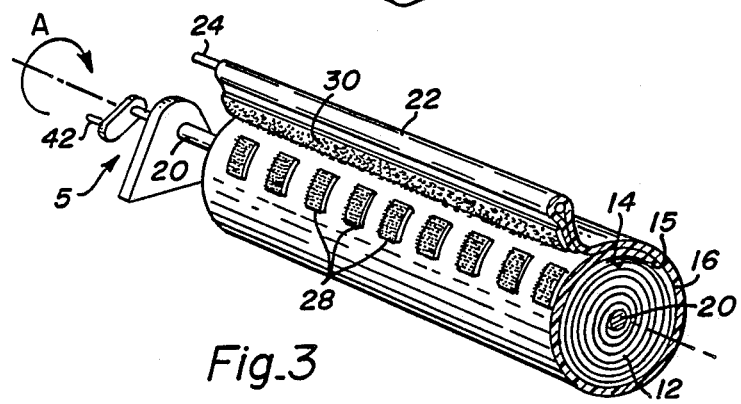
Fig_3

PROTECTIVE BLANKET FOR A SOLAR POOL COVER

FIELD

This invention relates generally to apparatus for retraction, storage, and protection of solar covers, and, more specifically, to apparatus providing a protective blanket wrap to stored swimming pool covers which is integral to the cover itself.

BACKGROUND AND INFORMATION DISCLOSURE STATEMENT

Solar heating type swimming pool covers have become a common addition to swimming pools in recent years as a cost efficient means for maintaining the temperature of the pool water at a comfortable level. The traditional forms of energy used in heating a pool are electricity and natural gas, but as these forms of energy become scarce and more expensive, the use of energy saving solar pool covers becomes more attractive.

These covers are usually fabricated of laminated plastic sheet material and may contain entrapped air chambers or bubbles for added flotation and heat retention. The main function of a solar cover is to prevent the loss of heat from the heated pool to the ambient atmosphere. The three modes by which heat is lost from an open body of water to the surrounding atmosphere are evaporation, surface convection, and surface conduction. By spreading a solar cover over the pool surface, the loss of heat by evaporation is essentially eliminated, while heat losses due to surface convection and conduction are substantially reduced. The construction of the cover is such that heat absorption from sunlight is increased.

The early pool covers were usually made of a single sheet of plastic, vinyl, or canvas. The advent of improved plastic technology and great interest in using solar radiation as an inexpensive source of energy has resulted in a number of improvements in the design and application of solar pool covers.

U.S. Pat. No. 4,103,368 to Locksaw, discloses a cover having a laminated structure of thin metal sheet sandwiched between transparent and opaque sheets of plastic. The cover is stored as a cylindrical wrap around a locus. Sleeves formed in the cover surface may be inflated to unfurl the wrapped cover. Spring fingers attached to the cover are biased to aid in transferring from the unwrapped (spread on the pool surface) to the wrapped configuration.

The problem of accumulation of rain water on plastic solar pool covers with inflatable air pockets is recognized in U.S. Pat. No. 4,313,421 Trihey, 1982. Trihey teaches the use of a two layer plastic cover having segmented air pockets spaced between downwardly projecting crests, wherein drainage holes are disposed to drain off excess rain water.

An alternative to the laminated sheet construction cover is disclosed in U.S. Pat. No. 4,470,404 to Kremen. A number of black plastic strips are submersibly suspended inside a pool which absorb solar radiation and transfers the collected energy to the pool by heat conduction.

As is the case for most solar pool covers, Trihey and Kremen provide for outside, exposed storage of their covers, by rolling them up about a drum or roller at one end of the pool.

The use of pulleys and cables applying balanced tension to extend or withdraw a cover over the entire pool surface is disclosed in patents such as U.S. Pat. Nos. 2,754,900 of Karbonick (1952), 3,019,450 of Karasiewicz (1962), and 3,864,761 of Stadler (1975). It is also old in the art to use light-weight rip-resistant materials for pool cover durability and safety; e.g., U.S. Pat. No. 3,593,757 of Haynes, 1971. Other inventions which are in the general field of related art but which do not anticipate the advantages of this invention include U.S. Pat. No. 2,845,976 which discloses a collapsible roll-up container and U.S. Pat. No. 4,512,332 which discloses a solar pond construction.

Despite all of these advances made in the field of solar pool covers, there are still problems that exist with exposure to all the seasonal elements during storage of the cover, including wind, rain, ice, snow and especially summer heat and sunlight. The pool covers are usually stored by being folded at pool side or rolled onto a special reeling device at one end of the pool. Particularly during the summer months, a large amount of heat builds up and is trapped within the folds or layers of the stored pool cover. Without the cooling effect of water a temperature of 125° F. can be reached in a clear plastic roll having air space construction on a sunny day within two hours or so, even when ambient temperature is relatively cool. At this temperature the plastic warps and the pool cover loses shape. Furthermore, in any degree of sunlight, plastic will degrade over a period of time, especially if translucent. Consequently, the appearance and usefulness of the pool cover deteriorates with time, sometimes with alarming rapidity.

For these reasons, the manufacturer of solar pool covers unanimously recommend that stored solar pool covers be protected from the elements (sun, rain, snow, wind). However, according to present practice the generally makeshift procedure of draping a relatively heavy blanket over the rolled up cover is awkward and inconvenient, and therefore is frequently neglected by the swimmer who reels in the pool cover. He or she is generally more interested in swimming than in protecting the rolled-up solar cover, and is usually unaware of the rapidity with which heat can build up and/or the cumulative damage inflicted by even short but frequent exposures by the sun.

Further, upon reeling up the cover, some pool water is present on at least the underside of the cover, which water is trapped in the rolled-up cover. This water can turn to steam on hot days, which due to the added presence of chlorine chemicals can yellow and accelerate the degradation of the plastic.

Therefore, there is an urgent need for a protective blanket for solar pool covers whose method of use offers automatic retraction, easy manipulation, convenient storage and protection.

THE INVENTION

OBJECTS

It is an object of this invention to provide a blanket for protecting a stored solar cover for a swimming pool from heat and pool chemical degradation due to exposure to sunlight.

It is another object of this invention to provide a protective blanket for a stored solar-type swimming pool cover having a UV inhibiting agent to protect against deterioration of the pool cover by UV radiation or UV plus pool chemical degradation.

It is another object of this invention to provide the protective blanket with means for attachment to the leading edge of the solar pool cover so that the blanket wraps around and fully encloses a stored solar pool cover as it is being furled about a storage locus.

It is another object of this invention to provide the protective blanket with means for retaining the stored solar pool cover in a furled configuration.

It is another object of this invention to provide a protective blanket that wraps around and fully encloses a stored solar pool cover so that the cover is protected against active degradation due to variants in seasonal weather conditions including but not limited to cold and freezing temperatures, wind, snow, rain, sleet and intense summer heat and sunlight.

SUMMARY

The protective blanket for a swimming pool cover of this invention is generally rectangular and has one edge attached to a free edge of the pool cover which covers the pool so that the width of the joining edges equals the width of the pool. The opposite edge of the cover may be attached to a reel positioned alongside the pool so that, in order to store the blanket-cover combination, the cover is first wound on the reel followed by the blanket. Thus the length of the cover must equal the length of the pool in order to cover the pool entirely but the length of the attached blanket section need only be sufficient to wrap entirely around the cover rolled onto the reel.

The material for the blanket should have a number of properties. These include:

Resistance to the corrosive effects of ambient water, (e.g. deionized water which is well known to be corrosive in certain situations, acid rain, which can have a PH ranging from 4 to 7, and chemical-laden pool water, principally halogen (chlorine, bromine) treated water;

A surface that is opaque, and preferably reflective, since the infrared portion of the sun's rays heat the roll and the ultraviolet portion tends to degrade the blanket material if absorbed;

Resistance to mechanical damage such as punctures and/or tears; and

Resistance to extremes in temperature of the weather.

These requirements are suitably met by white polypropylene, such as can be purchased from Tap Plastics, San Jose, Calif., as a viable material. Laminated sheets of polypropylene reinforced by fabric with edges that are hemmed or stitched provides greater strength than a single plastic sheet.

The edge of the blanket opposite to the edge joining the pool cover is folded and secured to itself (e.g. stitched) to form a sleeve so that a stiffening bar may be positioned in the sleeve and attached at a convenient location, preferable its center, to a nylon leash. The user pulls on the leash to lead the cover across the pool, and ties the free end of the leash to a fixed object, e.g. a stake, so that it is secured at the end of the pool opposite the reel.

Alternately, when the cover is stretched across the length of the pool, the protective blanket, which is typically one-eighth the length of the solar cover, may be folded back once or twice to provide a bundle one to three feet wide that can be weighted down by one or two 2"×4" lengths of wood, or any handy weighted object.

The joining edges of blanket and pool cover must be well secured to one another. One construction may be folds taker along each of the meeting edges and joined by nylon stitching or barbed plastic rivets or grommets.

After the cover and blanket have been rolled (furled) on the reel, the wrap is secured by one of several means. One means is to wrap a nylon rope around the roll, but the preferred means is to join pads of VELCRO TM material attached to both sides of the blanket.

Another embodiment of the invention is adaptable to a free form (e.g., kidney) shaped pool according to which spaced, parallel webs or cords attach one end of a free-form shaped cover to the reel and other spaced, parallel webs or cords attach the opposite edge to one edge of the blanket.

BRIEF DESCRIPTION OF DRAWINGS

FIG. 1 is a top view showing an unfurled pool cover with the protective blanket at the leading end thereof.

FIG. 2 is a perspective view of FIG. 1 showing the cover in place over the pool.

FIG. 3 is a perspective view in partial section showing the details of the protective blanket in use after the pool cover has been furled and how the end of the protective blanket is secured to an intermediate portion with VELCRO TM material.

DETAILED EMBODIMENT

Figure 4:
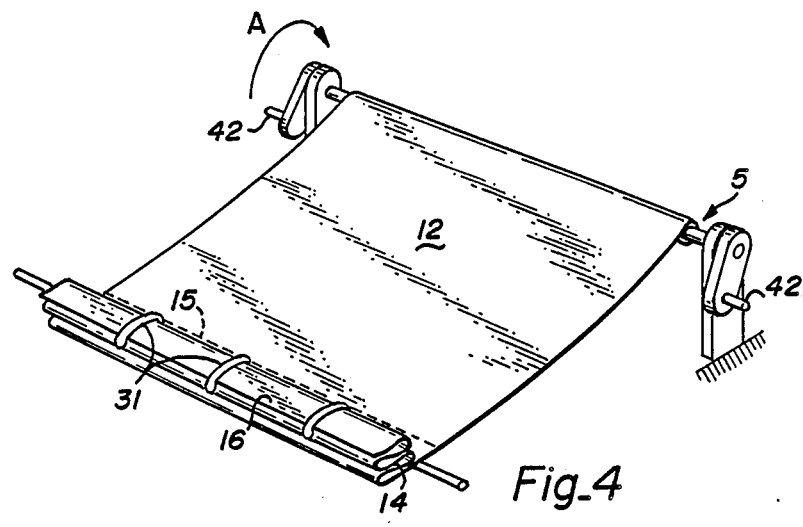
FIG. 4 shows a method of storing the protective blanket portion while the solar pool cover is in use.

The following detailed description illustrates the invention by way of example and not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

Turning now to FIGS. 1 and 2, these show the general construction of the solar cover-blanket combination 10 in the unfurled configuration as when the cover lies across a pool 1 (shown in phantom in FIG. 2). The solar pool cover 12 is shown attached at one end 13 to protective blanket 16 and at the opposite end 11 to the shaft 20 of the storage means 25 such as a reel (called generically a "storage locus") 5.

The cover 12 is further defined by a leading edge 14, that is alternately extended and retracted over a pool, and a trailing edge 18, that is permanently secured to the shaft 20 of storage means 25.

The leading edge 14 of the cover 12 overlaps the one edge 15 of the protective blanket 16 a sufficient amount to permit joining of the cover 12 and blanket 16 by a row of fastening means, such as barbed plastic rivets or grommets 17. The rivets 17 may be affixed at regular intervals (preferably 12 to 15 inches apart) and 1-2" from the edge of the blanket. Alternate means of joining the edges 14 and 15 include stitching, gluing, and fastening by use of VELCRO TM strips.

The free end 21 of the protective blanket 16 (preferably polypropylene) is folded over and stitched at 25 to form a sleeve 22 into which is positioned a stiffening rod 23 whose ends 24 are shown protruding from the sleeve 22. A Y-shaped nylon or polypropylene leash 26 is attached to the ends 24 of the stiffening rod 23 so that the protective blanket 16 and pool cover 12 may be unfurled from the reel 5 and pulled across the pool 1 by one person. The leash is preferably about two feet longer than the total length of the pool for this purpose.

In the preferred embodiment, VELCRO ™ hook and loop material is used to secure the furled (rolled up) cover 12 within the surrounding protective blanket 16. As best seen in FIGS. I and 3, a series of parallel, spaced VELCRO ™ strips 28 having a length in the range of approximately 6-24" are disposed face up along the top surface of the protective blanket 16 and are oriented lengthwise generally parallel to the longitudinal axis y-y of the pool cover 12. A mating strip of VELCRO ™ 30 (shown in phantom in FIG. 1) is disposed face up along the bottom surface (i.e., facing the pool bottom when in use) of the protective blanket 16 adjacent and parallel to the sleeve 22. When shaft 20 is rotated in the direction of Arrow A (See FIG. 2), the cover 12 is furled in a counter clockwise direction about the shaft 20. When the pool cover 12 and attached protective blanket 16 are fully furled, (that is, rolled up tightly in a storage position) the VELCRO ™ strips 28 cooperate with the mating VELCRO ™ strip 30 to retain the tightly wound pool cover 12 within the protective blanket 16.

This is best seen in FIG. 3 where the pool cover/blanket combination has been rolled up onto the reel 5, and the strips of VELCRO ™ 28 are about to engage the VELCRO ™ strip 30 to form a secure fastener against the wind, rain and other elements. The blanket 16 is dimensioned both laterally and longitudinally to completely surround a rolled up solar cover 12. The rolled blanket, as an enclosure, serves to protect the pool cover 12 from actinic degradation, wind, and heat buildup and may be left in place all winter without ill effect. This saves having to separately store the reel/pool cover indoors. To be effective for this purpose the width of the strips of VELCRO ™ used may be in the range of 1-4 inches.

An alternate method of securing and holding tight the rolled cover/blanket combination would be to provide the mating VELCRO ™ strip 30 in a series of strip-like tabs with one end fixed to the sleeve 22 and the free end disposed to engage the coordinate strip 28 after the blanket 16 is wrapped around the furled cover 12. While VELCRO ™ is the preferred retaining means, it is understood that other means such as elastic rope (e.g. bungee cords) may be used to adequately hold tight a protective blanket around a furled pool cover.

As best seen in FIG. 4, when the cover 12 is positioned across the pool, the protective blanket 16 may be folded back toward the meeting edge 14 several times and a suitable weight such as a board may be placed on the folded cover to maintain the cover in place. The blanket 16 and/or pool cover 12 may also be battened by inserting rib members (not shown) into transverse sleeve, formed into cover 12 and blanket 16 in maintaining a proper pool covering width.

The required length of the protective blanket 16 is about ⅛ to 1/5 the length of the cover. For example, the length of a protective blanket will be 5' to cover a pool cover 40' long. When the cover 12 has been stretched across the pool, the blanket 16 may be folded back on itself several times to form a neat bundle that is secured by the VELCRO ™ strips 28 and 30 of FIGS. 1 and 2 or the elastic ropes 31 of FIG. 4.

The constructions that have been described in the foregoing paragraphs have been designed for rectangular pools. It is understood that alternate embodiments of this invention can be constructed for alternate shapes, such as the free form shape illustrated in FIG. 5. That Figure shows a free form cover 50 over a corresponding free form pool (the pool is omitted for clarity). This particular construction shows the free form cover 50 attached to the reel 5 by means of parallel webs or cords 64 and, at the opposite end, to the protective blanket 44 by a combination using rivets 66 and parallel webs or cords 64a. The webs are preferably marine nylon or polypropylene, on the order of 1-3" wide.

Figure 5:
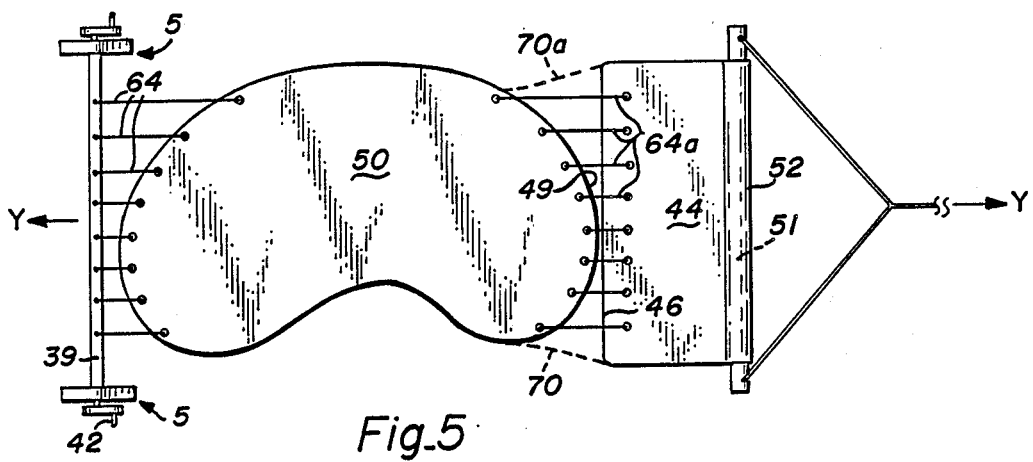
FIG. 5 shows an embodiment of the invention adapted to a "freeform" shaped pool.

As seen in FIG. 5, the cords 64 and 64a are of varying lengths to align the free form shaped pool cover over the pool along a common longitudinal axis y-y, said axis being generally transverse to parallel members 20 (shaft 20 of reel 5) and 51 (stiffening rod 51 within folded and stitched sleeve 52).

Alternately the rear edge 46 of blanket 44 may be joined to the leading edge 49 of pool cover 50 by a web of material therebetween, (either pool cover or blanket material, or rip-stop marine nylon), the edges of which are tapered as at 70, 70a to form an appropriate transaction to prevent tearing.

The preferred material for the solar cover is polyethylene because of its relatively greater resistance to degradation by sunlight than that of other plastics in the same price range. Thin transparent sheets of clear polyethylene having an array of air bubbles formed thereon, are available for construction of the cover. The preferred material of construction for the protective blanket 16 is a 3-ply polypropylene/nylon sandwich, comprising a top layer (the top layer being the surface exposed to sunlight) of blue or green opaque polypropylene sheet, a middle reinforcing layer of nylon mesh, and a bottom layer (i.e. the layer facing the pool surface) of black opaque polypropylene sheet. Flexible, single sheets of heavy-duty (5-50 mil) opaque white polypropylene are also available for construction of the blanket. The same blanket may be used in winter or summer.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A combined swimming pool cover and protective blanket assembly that is alternately extendable over a pool during use and retractable into a self-contained storage position adjacent the pool during nonuse, said pool cover and blanket assembly comprising in operative combination:
    (a) a pool cover member having a length and width dimension sufficient to cover a pool, said length dimension being defined between a first leading end and a second trailing end;
    (b) a generally rectangular blanket member having a first free end, a second pool cover end, and spaced opposed sides, said blanket having a width dimension at least as wide as said width dimension of said pool cover, and an axial length dimension at least about ⅛ the axial length of said pool cover;
    (c) means for attachment of said first leading end of said pool cover to said second pool cover end of said blanket so that the blanket and pool cover are substantially co-planar and the length axis of both are co-axial;
    (d) said blanket having a top outer surface and a bottom inner surface, said blanket being specially dimensioned to completely shelter and encapsulate said pool cover when said blanket is furled about said pool cover in a storage position with:
  (i) said bottom inner surface of said blanket in contact with the sun-facing, outer top surface of said pool cover;
  (ii) said top outer surface of said blanket is exposed to the elements;
(e) said blanket member is of flexible sheet material resistant to actinic rays, heat and pool water chemicals;
(f) means for retaining said pool cover within said protective blanket in a tightly secured storage position; and
(g) means for unfurling said assembly and drawing said pool cover across said pool attached to said blanket free end.

2. A pool cover and blanket assembly as in claim 1 which includes:
  (a) a pool cover storage reel;
  (b) means for securing said trailing end of said pool cover to said reel;
  (c) said blanket being dimensioned to wrap around said pool cover at least once when said pool cover is completely furled on said reel.

3. A pool cover and blanket assembly as in claim 1 wherein said unfurling means includes a leash to facilitate manual operation of extending said pool cover and blanket over the pool.

4. A pool cover and blanket assembly as in claim 3 wherein:
  (a) said leash is attached to a stiffening rod; and
  (b) said stiffening rod is insertable within a sleeve formed along the width dimension of said free end of said blanket.

5. A pool cover and blanket assembly as in claim 2 wherein said blanket to pool cover attachment means includes a plurality of fastening members evenly spaced along an overlapping union of said first leading end of said pool cover with said second pool cover end of said blanket.

6. A pool cover and blanket assembly as in claim 5 wherein said fastening member are reinforced by stitches in said overlapping ends of said pool cover and said blanket to each other.

7. A pool cover and blanket assembly as in claim 4 wherein said blanket to pool cover attachment means includes a plurality of fastening members evenly spaced along an overlapping union of said first leading end of said pool cover with said second pool cover end of said blanket.

8. A pool cover and blanket combination as in claim 2 wherein said retaining means includes mating strips of hook and loop type fastening material affixed along both top and bottom surfaces of said blanket adjacent said free end thereof, so that upon the rolled storage of said pool cover and blanket about said reel, said blanket wraps around and encloses said pool cover and is further wrapped about itself for a sufficient overlap portion to permit said hook and loop material along the underside of the trailing free end portion of said blanket to engage and secure the corresponding mating hook and loop material along the outer surface of said blanket portion immediately being overlapped.

9. A pool cover and blanket combination as in claim 7 wherein said retaining means includes mating strips of hook and loop type fastening material affixed along both top and bottom surfaces of said blanket adjacent said free end thereof, so that upon the rolled storage of said pool cover and blanket about said reel, said blanket wraps around and encloses said pool cover and is further wrapped about itself for a sufficient overlap portion to permit said hook and loop material along the underside of the trailing free end portion of said blanket to engage the corresponding mating velcro material along the outer surface of said blanket portion immediately being overlapped.

10. A pool cover and blanket assembly as in claim 8 wherein said blanket is a multi-layered plastic sheet including:
  (a) a top layer of opaque polypropylene material for resisting active degradation due to constant exposure to adverse whether elements including prolonged exposure to UV radiation, said top layer being the outer-most surface of said assembly when said assembly is in said stored configuration;
  (b) at least one intermediate layer of plastic mesh to provide structural integrity, reduce sagging and stretching of said blanket, and to resist punctures and tears in said blanket; and
  (c) a bottom layer of semi-translucent polypropylene material.

11. A pool cover and blanket assembly as in claim 9 wherein said blanket is a multi-layered plastic sheet including:
  (a) a top layer of opaque polypropylene material for resisting active degradation due to constant exposure to adverse whether elements including prolonged exposure to UV radiation, said top layer being the outer-most surface of said assembly when said assembly is in said stored configuration;
  (b) at least one intermediate layer of plastic mesh to provide structural integrity, reduce sagging and stretching of said blanket, and to resist punctures and tears in said blanket; and
  (c) a bottom layer of semi-translucent polypropylene material.

12. A pool cover and blanket assembly as in claim 5 wherein said retaining means is at least one elastic rope.

13. A pool cover and blanket assembly as in claim 5 wherein
  (a) said retaining means includes snap fasteners having mating ends attached to said outer and inner surfaces of said blanket; and
  (b) said snap fasteners along said top outer surface of said blanket portion are disposed to align with and engage the corresponding snap fasteners along said bottom inner surface of said blanket when said blanket wraps around the rolled pool cover and about itself.

14. A pool cover and blanket assembly as in claim 2 wherein
  (a) said pool cover is generally rectangular.

15. A pool cover and blanket assembly as in claim 2 wherein said pool cover is free form.

16. A pool cover and blanket assembly as in claim 8 wherein
  (a) said pool cover is generally rectangular.

17. A pool cover and blanket assembly, as in claim 8 wherein said pool cover is free form.

18. A pool cover and blanket assembly as in claim 15 wherein said means for attachment of said pool cover to said blanket includes a plurality of grommets adjacent the leading edge of said pool cover and adjacent the second pool cover end of said blanket, and at least one line passing through said grommets to axially align said blanket with said pool cover.

19. A pool cover and blanket assembly as in claim 15 wherein said means for attachment of said pool cover to said blanket includes a web of material shaped to axially align said blanket with said pool cover.

20. A protective blanket assembly for protecting a pool cover, having a first leading edge and a second trailing edge when said pool cover is in a furled configuration comprising:

(a) a generally rectangular blanket member having a first free end, a second pool cover end, and spaced opposed sides, said blanket having a width dimension at least as wide as said width dimension of said pool cover, and an axial length dimension of at least ⅛ the axial length of said pool cover;

(b) first means attached to said pool cover end of said blanket, and second means attachable to said leading end of said pool cover for attachment of said first leading end of said pool cover to said second pool cover end of said blanket so that the blanket and pool cover are substantially co-planar and the length axis of both are co-axial;

(c) said blanket having a top outer surface and a bottom inner surface, said blanket being specially dimensioned to completely shelter and encapsulate said pool cover when said blanket is furled about said pool cover in a storage position;

(d) said blanket member is of flexible sheet material resistant to actinic rays, heat and pool water chemicals; and (e) means for retaining said pool cover within said protective blanket in a tightly secured storage position.

* * * * *